(12) United States Patent
Velichko et al.

(10) Patent No.: US 9,232,159 B2
(45) Date of Patent: Jan. 5, 2016

(54) IMAGING SYSTEMS WITH CROSSTALK CALIBRATION PIXELS

(71) Applicant: Semiconductor Components Industries, LLC, Phoenix, AZ (US)

(72) Inventors: Sergey Velichko, Boise, ID (US); Gennadiy Agranov, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 69 days.

(21) Appl. No.: 13/955,765

(22) Filed: Jul. 31, 2013

(65) Prior Publication Data

US 2014/0078349 A1 Mar. 20, 2014

Related U.S. Application Data

(60) Provisional application No. 61/703,657, filed on Sep. 20, 2012.

(51) Int. Cl.
*H04N 5/357* (2011.01)
*H04N 5/217* (2011.01)
*H04N 5/359* (2011.01)

(52) U.S. Cl.
CPC ............... *H04N 5/357* (2013.01); *H04N 5/359* (2013.01)

(58) Field of Classification Search
USPC .................................................. 348/243, 245
See application file for complete search history.

(56) References Cited

U.S. PATENT DOCUMENTS

| | | | | |
|---|---|---|---|---|
| 5,521,639 | A * | 5/1996 | Tomura | H01L 27/14831 257/E27.154 |
| 7,427,735 | B2 * | 9/2008 | Eskerud | H04N 5/374 250/208.1 |
| 8,350,934 | B2 | 1/2013 | Chao et al. | |
| 8,481,907 | B2 | 7/2013 | Seshadri et al. | |
| 9,106,785 | B2 * | 8/2015 | Maeda | H04N 9/045 |
| 2003/0223004 | A1 * | 12/2003 | Kubota | H04N 5/2251 348/294 |
| 2005/0057655 | A1 * | 3/2005 | Duesman et al. | 348/187 |
| 2006/0237629 | A1 * | 10/2006 | Oda | 250/208.1 |
| 2007/0164335 | A1 * | 7/2007 | McKee | 257/294 |
| 2009/0213256 | A1 * | 8/2009 | Kudoh | 348/302 |
| 2011/0058072 | A1 * | 3/2011 | Wang et al. | 348/242 |
| 2011/0069210 | A1 * | 3/2011 | Ogura et al. | 348/247 |
| 2011/0242376 | A1 * | 10/2011 | Ando | 348/294 |
| 2012/0206635 | A1 * | 8/2012 | Kikuchi et al. | 348/308 |

* cited by examiner

*Primary Examiner* — Nhan T Tran
*Assistant Examiner* — Wesley J Chiu
(74) *Attorney, Agent, or Firm* — Treyz Law Group, P.C.; Jason Tsai

(57) ABSTRACT

An image sensor may include crosstalk calibration pixels. Crosstalk calibration pixels may include exposed pixels and shielded pixels. Exposed pixels may be partially or completely surrounded by shielded pixels. Calibration pixels may be formed in a checkerboard pattern of alternating shielded and exposed pixels or a double checkerboard pattern of alternating pairs of shielded and exposed pixels. Exposed pixels may have apertures of various size in a shielding layer that shields the shielded pixels from light. Signals generated by exposed and shielded pixels may be used in assessing pixel optical and electrical crosstalk and indirectly deducing the spectral composition of incoming light for particular locations in a pixel array. Information about local crosstalk across the array may be used in coordinate dependent color correction matrices, white balance algorithms, luminance and chroma noise cancellation, edge sharpening, assessment of pixel implantation depth, and measuring a modulation transfer function.

16 Claims, 5 Drawing Sheets

IMAGING SYSTEMS WITH CROSSTALK CALIBRATION PIXELS

This application claims the benefit of provisional patent application No. 61/703,657, filed Sep. 20, 2012, which is hereby incorporated by reference herein in its entirety.

BACKGROUND

This relates generally to imaging systems, and more particularly, to imaging systems with crosstalk calibration pixels.

Image sensors are commonly used in electronic devices such as cellular telephones, cameras, and computers to capture images. Conventional image sensors are fabricated on a semiconductor substrate using complementary metal-oxide-semiconductor (CMOS) technology or charge-coupled device (CCD) technology.

An image sensor may include an active pixel array in which each pixel includes a photodiode. Conventional image sensors can suffer from optical and/or electrical pixel crosstalk. In can be difficult to effectively avoid image artifacts such as video color noise, color shift, and/or over or under sharpening of edges in processed images due to varying crosstalk with varying scene content, especially in the case of a monochromatic pixel array.

It would therefore be desirable to be able to provide image sensors having improved crosstalk calibration.

DETAILED DESCRIPTION

Electronic devices such as digital cameras, computers, cellular telephones, and other electronic devices include image sensors that gather incoming light to capture an image. The image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
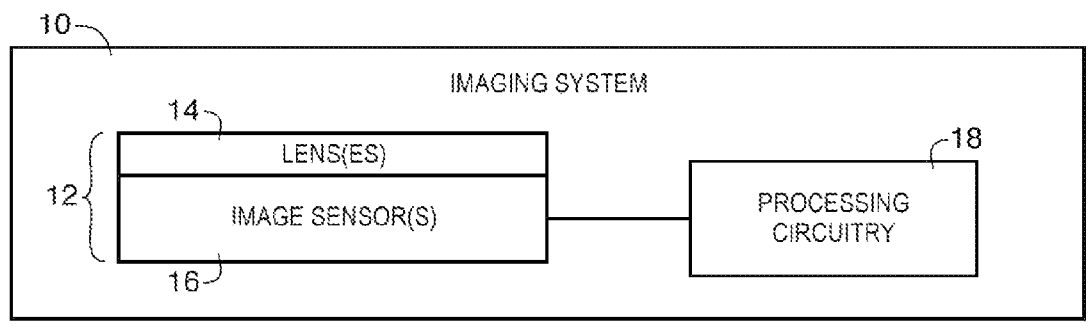
FIG. 1 is a diagram of an illustrative imaging system having an image sensor with crosstalk calibration pixels in accordance with an embodiment of the present invention.

FIG. 1 is a diagram of an illustrative imaging system having an image sensor for capturing images. System 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 may include circuitry for converting analog pixel data into corresponding digital image data to be provided to processing circuitry such as storage and processing circuitry 18. If desired, camera module 12 may be provided with an array of lenses 14 and an array of corresponding image sensors 16.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
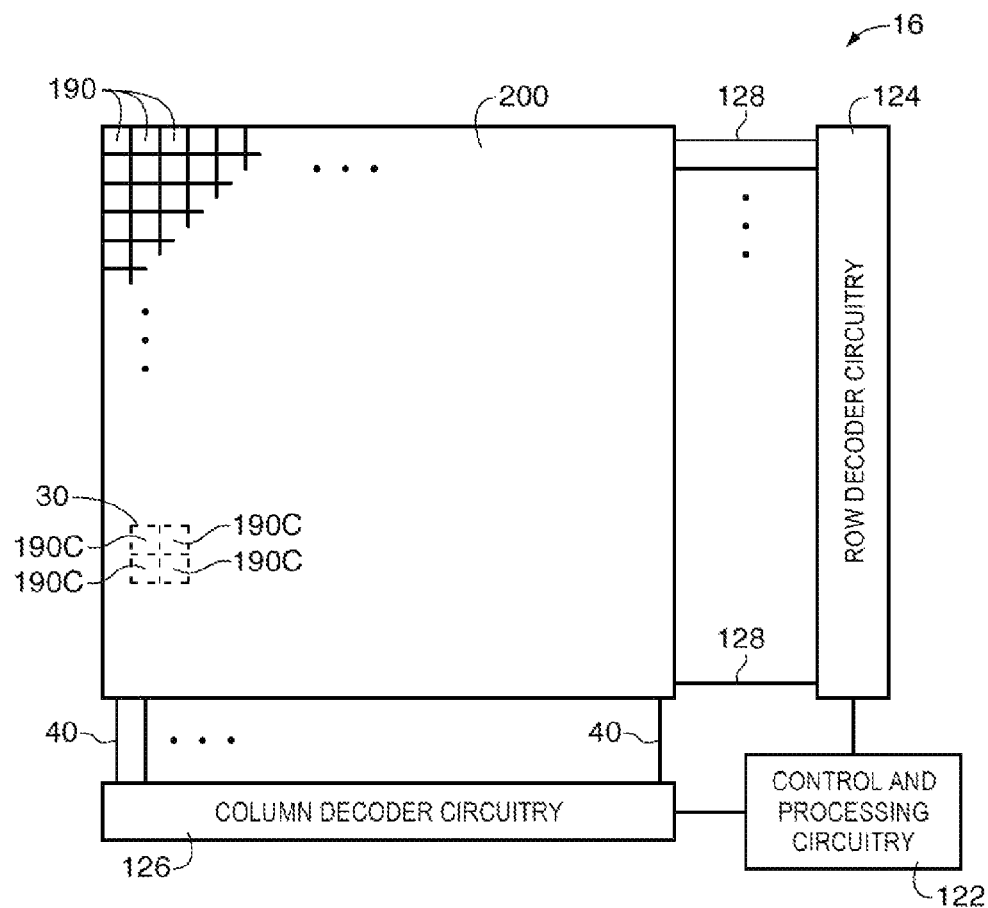
FIG. 2 is a diagram of an illustrative pixel array with crosstalk calibration pixels in accordance with an embodiment of the present invention.

As shown in FIG. 2, image sensor 16 may include an array of image pixels such as pixel array 200 containing image sensor pixels 190 (sometimes referred to herein as image pixels or pixels) and control and processing circuitry 122. Array 200 may contain, for example, hundreds or thousands of rows and columns of image sensor pixels 190. Control circuitry 122 may be coupled to row decoder circuitry 124 and column decoder circuitry 126. Row decoder circuitry 124 may receive row addresses from control circuitry 122 and supply corresponding row control signals such as reset, row-select, transfer, and read control signals to pixels 190 over control paths 128. One or more conductive lines such as column lines 40 may be coupled to each column of pixels 190 in array 200. Column lines 40 may be used for reading out image signals from pixels 190 and for supplying bias signals (e.g. bias currents or bias voltages) to pixels 190. During pixel readout operations, a pixel row in array 200 may be selected using row decoder circuitry 124 and image data associated with image pixels 190 in that pixel row can be read out along column lines 40.

Image pixels 190 may be complementary metal-oxide-semiconductor (CMOS) image pixels, charge-coupled-device (CCD) image pixels or may employ other types of imaging circuitry. As an example. CMOS image pixels may include a photosensitive element such as a photodiode, a positive power supply terminal, a ground power terminal, and transistors such as reset transistors, source follower transistors, transfer transistors, etc. Incoming light may be collected by a photosensitive element such as photodiode after passing through a color filter element. Charges generated on the photodiode in response to the incoming light may be transferred to a charge storage region such as a floating diffusion region implemented using a region of doped semiconductor (e.g. a doped silicon region formed in a silicon substrate by ion implantation, impurity diffusion, or other doping techniques). An image signal associated with the stored charge on can be conveyed along a column line to column circuitry such as column decoder circuitry 126.

Column decoder circuitry 126 may include sample-and-hold circuitry, amplifier circuitry, analog-to-digital conversion circuitry, bias circuitry, column memory, latch circuitry for selectively enabling or disabling the column circuitry, or other circuitry that is coupled to one or more columns of pixels in array 200 for operating pixels 190 and for reading out image signals from pixels 190. Readout circuitry such as signal processing circuitry associated with column decoder circuitry 126 (e.g., sample-and-hold circuitry and analog-to-digital conversion circuitry) may be used to supply digital image data to processor 18 (FIG. 1).

As shown in FIG. 2, image pixel array 200 may include a calibration region 30 that includes crosstalk calibration pixels 190C. Crosstalk calibration pixels may include exposed crosstalk calibration pixels that receive image light and shielded crosstalk calibration pixels that are shielded from receiving direct illumination. Shielded crosstalk calibration pixels may receive only optical and/or electrical crosstalk signals from neighboring exposed crosstalk calibration pixels. Calibration signals generated by exposed and shielded calibration pixels 190C may be used to allow assessing of pixel crosstalk and thus to indirectly deduce the spectral composition of incoming light. For example, the ratio of signals from shielded pixels immediately surrounding an exposed pixel to a signal generated by the exposed pixel is directly correlated to pixel optical and electrical crosstalk and can be used to determine the amount of crosstalk in those pixels. Calibration signals generated by exposed and shielded calibration pixels 190C may be used to provide direct information about crosstalk for particular location in pixel array 200.

Crosstalk information obtained using pixels 190C may be used to adjust processing of image data captured using pixels 190. As examples, crosstalk information obtained using pixels 190C may be used to determine whether to employ more or less aggressive image edge sharpening, use different color correction matrices based on indirectly deduced incoming light spectrum, etc. Information about local crosstalk across the pixel array can be used in coordinate dependent color correction matrices, algorithms of white balance, luminance and chroma noise cancellation, coordinate dependent sharpening, etc. Crosstalk information of this type can be especially important for cameras and imaging systems with non-telecentric low profile lenses.

Additionally, information obtained using pixels 190C may be utilized during manufacturing processes to control sensor quality. For example, crosstalk calibration pixels 190C may be used by measuring pixel crosstalk with a calibration light source (e.g., a near infrared light source) to assess photodiode (PD) implantation depth. Deeper PD depth lowers pixel crosstalk and vice versa. Providing image sensors with crosstalk calibration pixels 190C may also allow a sensor manufacturer to measure and therefore guarantee some pixel array parameters such as a modulation transfer function (MTF) or pixel crosstalk limits at specific wavelengths that are of interest to customers.

Calibration portion 30 of array 200 may be arranged in various configurations.

Figure 3:
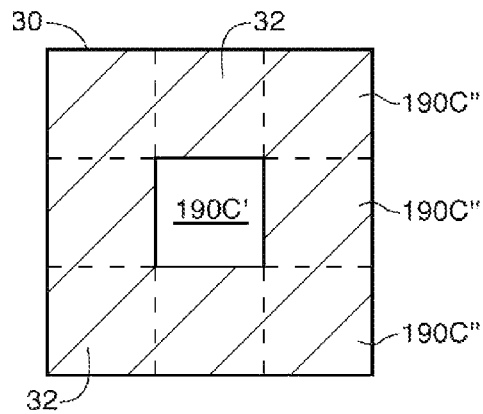
FIG. 3 is a diagram of a portion of an illustrative pixel array showing how crosstalk calibration pixels may be arranged in a pattern having an exposed pixel surrounded by shielded pixels in accordance with an embodiment of the present invention.

In the example of FIG. 3, calibration portion 30 includes a single exposed crosstalk calibration pixel 190C' that is completely surrounded by shielded crosstalk calibration pixels 190C". Shielded crosstalk calibration pixels 190" may be shielded from incoming light by shield layer 32 (e.g., a metal layer). Signals generated by shielded crosstalk calibration pixels 190C" may be combined with signals from exposed crosstalk calibration pixel 190C' to form crosstalk information such as crosstalk calibration data. Region 30 may include one or more exposed pixels 190C' that are each completely surrounded by shielded crosstalk calibration pixels 190C".

Figure 4:
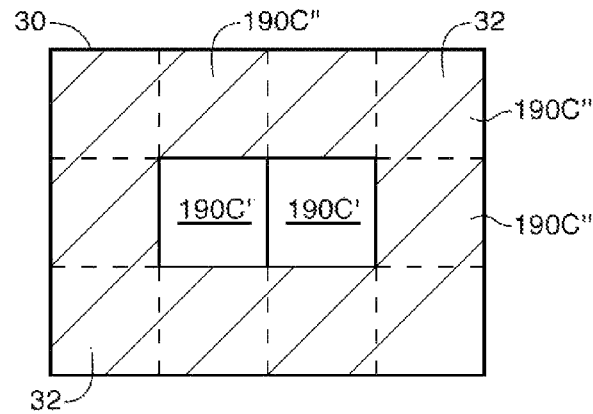
FIG. 4 is a diagram of a portion of an illustrative pixel array showing how crosstalk calibration pixels may be arranged in a pattern having two adjacent exposed pixels that are surrounded by shielded pixels in accordance with an embodiment of the present invention.

In the example of FIG. 4, calibration portion 30 includes two adjacent exposed crosstalk calibration pixels 190C' that are completely surrounded by shielded crosstalk calibration pixels 190C". Region 30 may include one or more pairs of exposed pixels 190C' in which each pair is completely surrounded by shielded crosstalk calibration pixels 190C". However, the examples of FIGS. 3 and 4 are merely illustrative. If desired, region 30 may include a pixel 190C' of the type shown in FIG. 3 along with a pair of pixels 190C' of the type shown in FIG. 4, multiple pixels 190C' of the type shown in FIG. 3 along with a pair of pixels 190C' of the type shown in FIG. 4, multiple pairs of pixels 190C' of the type shown in FIG. 4 along with a pixel 190C' of the type shown in FIG. 3, multiple pixels 190C' of the type shown in FIG. 3 along with multiple pairs of pixels 190C' of the type shown in FIG. 4, or may include sets of three, four, or more than four adjacent exposed pixels 190C' that are completely surrounded by shielded pixels 190C".

Providing one or more regions 30 of array 200 that include various numbers of adjacent exposed pixels that are surrounded by shielded pixels may allow measurement of crosstalk on various associated spatial frequencies.

Figure 5:
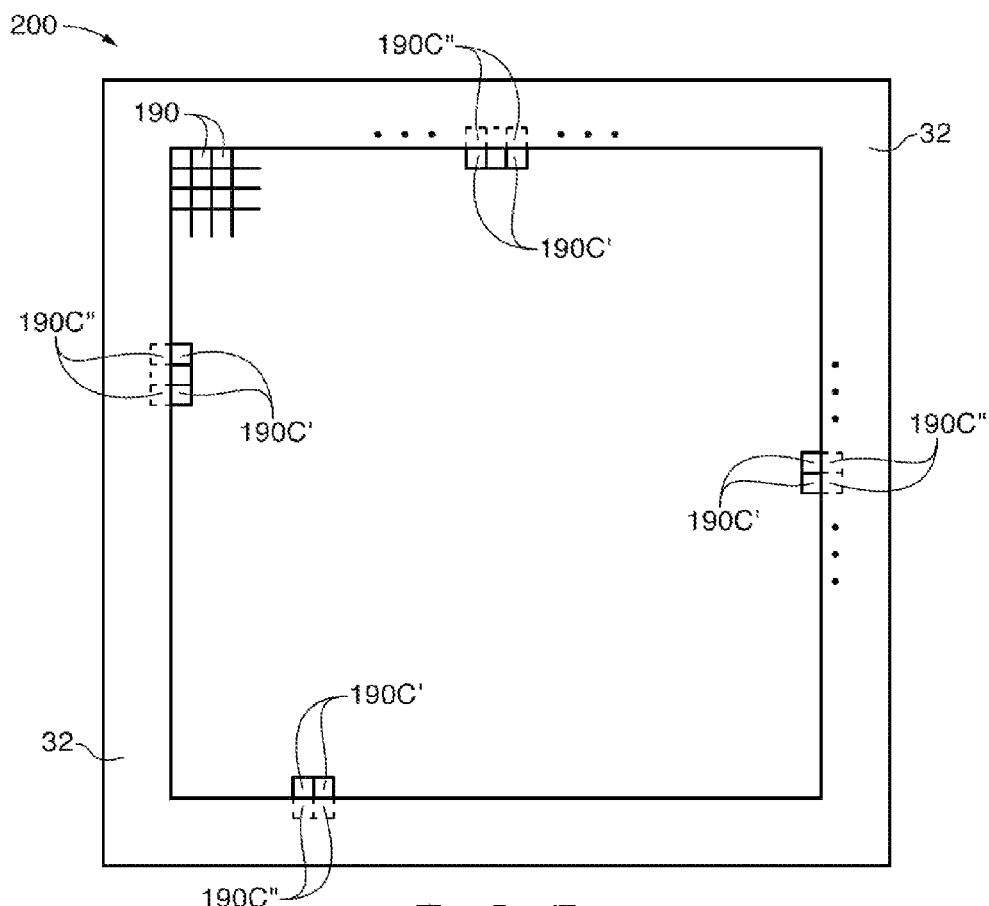
FIG. 5 is a diagram of an illustrative pixel array showing how crosstalk calibration pixels may be formed from exposed pixels that are adjacent to shielded pixels along edges of the array in accordance with an embodiment of the present invention.

If desired, crosstalk calibration pixels 190C may be formed from shielded pixels 190C" that run along one or more edges of array 200 and adjacent exposed pixels 190C' as shown in FIG. 5.

Figure 6:
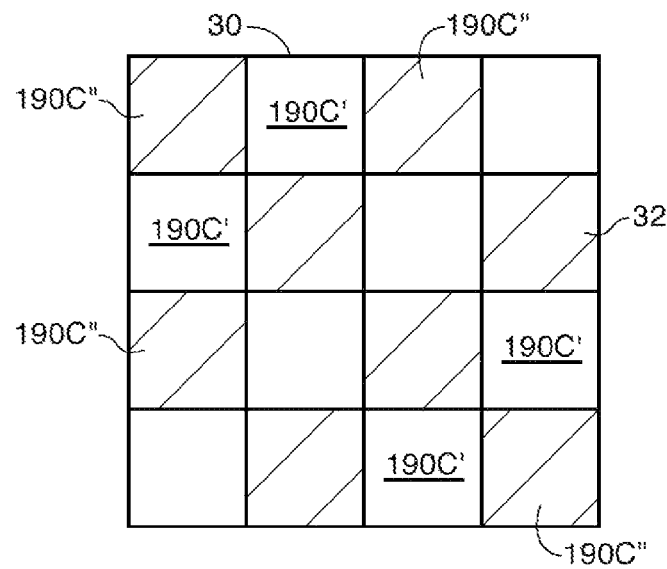
FIG. 6 is a diagram of a portion of an illustrative pixel array showing how crosstalk calibration pixels may be arranged in a checkerboard pattern in which exposed pixels alternate with shielded pixels in accordance with an embodiment of the present invention.

If desired, crosstalk calibration pixels 190C may be formed in a checkerboard pattern in which exposed pixels 190C' alternate with adjacent shielded pixels 190C" as shown in FIG. 6.

Figure 7:
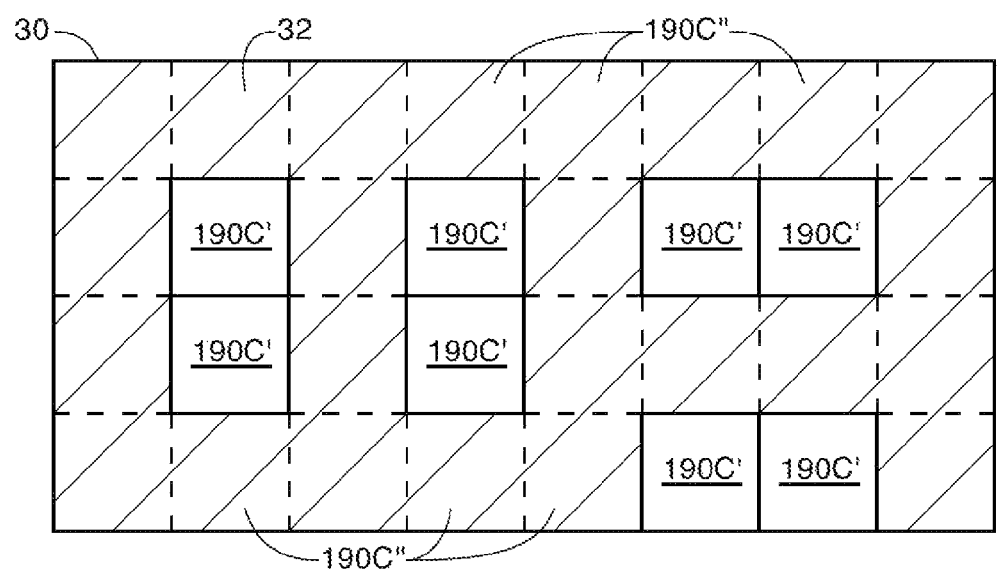
FIG. 7 is a diagram of a portion of an illustrative pixel array showing how crosstalk calibration pixels may be arranged in a double checkerboard pattern having an alternating pairs of two adjacent exposed pixels and two adjacent shielded pixels in accordance with an embodiment of the present invention.

If desired, crosstalk calibration pixels 190C may be formed in a double checkerboard pattern in which pairs of exposed pixels 190C' alternate with adjacent pairs of shielded pixels 190C" as shown in FIG. 7. As shown in FIG. 7, pairs of exposed crosstalk calibration pixels 190C' can be oriented in multiple directions in array 200 (e.g., vertically oriented pairs of pixels 190C' and horizontally oriented pairs of pixels 190C' may be arranged in region 30).

Configurations of the type shown in FIG. 6 in which every second pixel is completely shielded (e.g., covered by metal) may be used to measure crosstalk and determine a modulation transfer function (MTF) at the Nyquist frequency of the pixels. Configurations of the type shown in FIG. 7 in which pairs of exposed calibration pixels are surrounded by shielded pixels may be used to measure crosstalk and determine a MTF at half of the Nyquist frequency of a pixel.

Figure 8:
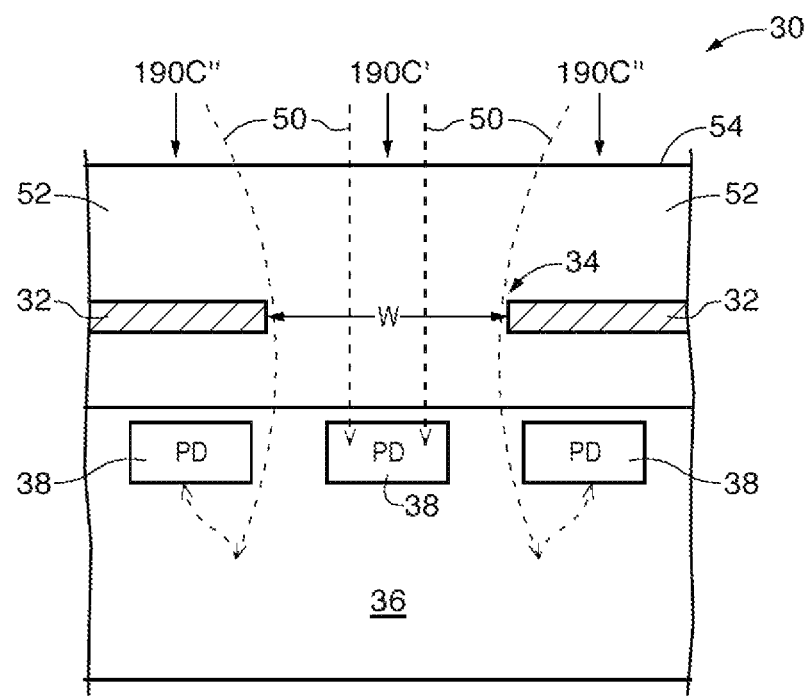
FIG. 8 is a cross-sectional view of a calibration region of an image pixel array on an image sensor in accordance with an embodiment of the present invention.

FIG. 8 is a cross sectional view of a calibration region such as calibration region 30 of a pixel array such as pixel array 200. As shown in FIG. 8, each pixel 190 may include a photosensitive element such as one of photodiodes 38 formed in a substrate such as substrate 36 (e.g., a silicon substrate, an epitaxial layer such as a p-type epitaxial layer on a silicon substrate, or other suitable substrate in which photosensitive elements can be formed). Photodiodes 38 of shielded pixels 190C" may be shielded from incoming light such as light 50 by shielding layer 32. Shielding layer 32 may be formed from metal such as aluminum, tungsten, copper, alloys of these metals, other suitable metals or metal alloys. Metal layer 32 may include coatings such as an antireflective coating that helps prevent light that is incident on layer 32 from reflecting within image sensor 16.

Metal layer 32 may be formed as a buried light shield or may be formed as a portion of a first metal layer of a dielectric stack for image sensor 16. For example, additional metal layers may be formed in material 52 (e.g., a dielectric material) to form a dielectric stack that includes metal interconnects for routing signals from pixels 190. If desired, additional pixel structures such as a color filter element and a microlens for each pixel (not shown) may be formed on material 52 (e.g., on front surface 54 of material 52).

As shown in FIG. 8, metal layer 32 may include an opening such as aperture 34 over photodiode 38 of an exposed crosstalk calibration pixel 190C'. Aperture 34 allows light 50 to pass through the aperture onto photodiode 38 of pixel 190C'. In the example of FIG. 8, aperture 34 has a width W that is substantially equal to the lateral size of the pixel. In this type of configuration, some of light 50 that passes through aperture 34 of pixel 190C' may be absorbed by photodiodes 38 of neighboring shielded pixels 190C". Because only light from pixel 190C' is absorbed by the photodiodes of pixels 190C", the ratio of signals generated by pixels 190C' and 190C" can help determine how much optical crosstalk affects pixels 190C". However, the configuration of region 30 shown in FIG. 8 is merely illustrative. If desired, aperture 34 can have a width that is different from the size of the pixel over which it is located.

In some applications it may be preferable to reduce the optical component of the pixel crosstalk for calibration purposes. For example, for near infrared sensitive applications, because near infrared light penetrates deeper into a sensor array substrate, it may be preferable to measure only the electrical component of the pixel crosstalk in order to assess the amount of near infrared content of incoming light.

Figure 9:
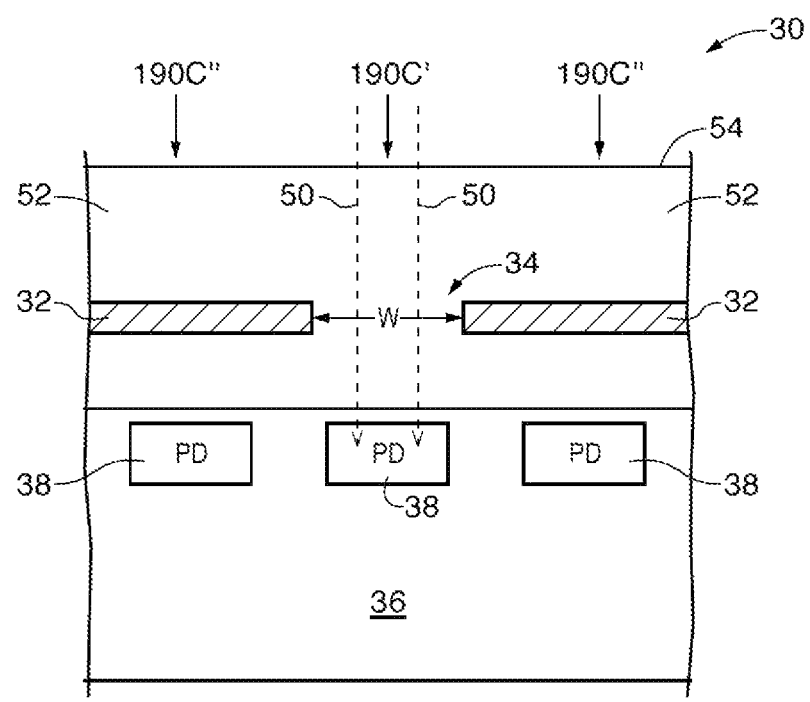
FIG. 9 is a cross-sectional view of a calibration region of an image pixel array on an image sensor showing how an aperture for an exposed crosstalk calibration pixel can be smaller in size than the size of the pixel to reduce optical crosstalk in adjacent shielded crosstalk calibration pixels in accordance with an embodiment of the present invention.

In the example of FIG. 9, width W of aperture 34 is smaller than the lateral width of exposed crosstalk calibration pixel 190C' so that light that passes through aperture 34 can only be incident on photodiode 38 of that pixel. In this way, optical crosstalk can be prevented from affecting adjacent shielded crosstalk calibration pixels 190C". Because signals will be generated by photodiode 190C' in response to light 50 that has passed through aperture 34 having a width that is smaller than the pixel, electrical crosstalk with nearby pixels may still be generated. This electrical crosstalk can be measured and used for image processing and/or manufacturing optimization and characterization using the signals from pixel 190C' and nearby pixels 190C".

In some configurations, array 200 may include multiple exposed crosstalk calibration pixels 190C' with multiple different apertures. Crosstalk pixels with different apertures may be included in a common region 30 of array 200 or may be located in separate regions 30 of array 200. Providing array 200 with a combination of crosstalk calibration pixels with different apertures can help determine a correct assessment of both electrical and optical components of the crosstalk.

Figure 10:
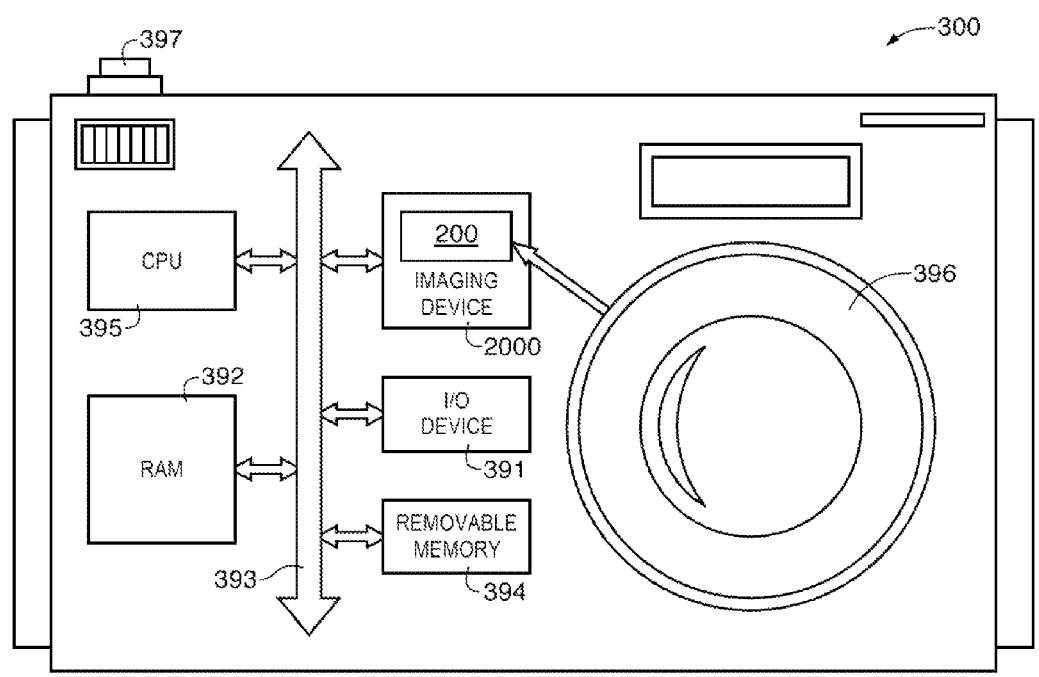
FIG. 10 is a block diagram of a processor system employing the embodiments of FIGS. 1-9 in accordance with an embodiment of the present invention.

FIG. 10 shows in simplified form a typical processor system 300, such as a digital camera, which includes an imaging device 2000 (e.g., an imaging device 2000 having an image pixel array 200 with crosstalk calibration pixels as described above). The processor system 300 is exemplary of a system having digital circuits that could include imaging device 2000. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 200 of device 2000 when a shutter release button 397 is pressed, central processing unit (CPU) 395, such as a microprocessor which controls camera and one or more image flow functions, which communicates with one or more input/output (I/O) devices 391 over a bus 393. Imaging device 2000 also communicates with the CPU 395 over bus 393. The system 300 also includes random access memory (RAM) 392 and can include removable memory 394, such as flash memory, which also communicates with CPU 395 over the bus 393. Imaging device 2000 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating imaging systems having image sensors with arrays of image sensor pixels with calibration regions that include crosstalk calibration pixels. The crosstalk calibration pixels may include exposed crosstalk calibration pixels that are adjacent to or surrounded by shielded crosstalk calibration pixels. Crosstalk calibration pixels may include a single exposed crosstalk calibration pixel that is completely surrounded by shielded crosstalk calibration pixels, pairs of exposed crosstalk calibration pixels that are completely surrounded by shielded crosstalk calibration pixels, a checkerboard pattern of alternating shielded and exposed crosstalk calibration pixels, a double checkerboard pattern of alternating pairs of crosstalk calibration pixels, or other configurations of shielded and exposed crosstalk calibration pixels.

Exposed crosstalk calibration pixels may have an aperture in a metal shielding layer that shields the shielded crosstalk calibration pixels from incoming light. The aperture may have an aperture size that is substantially equal to the size of the exposed pixel or may have a size that is smaller than the size of the exposed pixel. The metal shielding layer may be formed as a buried light shield between pixel photodiodes and associated color filter elements. The metal shielding layer may, if desired, be formed as a portion of a dielectric stack for the pixel array.

The array of image sensor pixels may include multiple calibration regions with crosstalk calibration pixels located at various separate locations in the array that provide signals for determining crosstalk or other characteristics of the array at those separate locations.

The imaging system may include processing circuitry configured to process signals from exposed crosstalk calibration pixels and associated shielded crosstalk calibration pixels to determine an amount of crosstalk between the exposed crosstalk calibration pixels and the associated shielded crosstalk calibration pixels, to deduce a spectral content of incoming light, to modify or adjust system operations such as image edge sharpening operations and color correction operations based on the processed signals and/or to determine a modulation transfer function, pixel implantation depth, or other pixel characteristics of the image sensor pixels.

The foregoing is merely illustrative of the principles of this invention which can be practiced in other embodiments.

What is claimed is:

1. An image sensor, comprising:
an array of image sensor pixels, wherein the array of image sensor pixels includes a calibration region having crosstalk calibration pixels, wherein the crosstalk calibration pixels comprise:
a plurality of shielded crosstalk calibration pixels; and
two exposed crosstalk calibration pixels that share an edge, wherein all other edges of the two exposed crosstalk calibration pixels are shared with the plurality of shielded crosstalk calibration pixels.

2. The image sensor defined in claim 1 wherein the crosstalk calibration pixels in the calibration region include a double checkerboard pattern of alternating pairs of exposed crosstalk calibration pixels and pairs of shielded crosstalk calibration pixels.

3. The image sensor defined in claim 1 wherein the crosstalk calibration pixels in the calibration region further comprise:
at least one single exposed crosstalk calibration pixel that is completely surrounded by shielded crosstalk calibration pixels.

4. The image sensor defined in claim 1, further comprising:
a substrate, wherein the crosstalk calibration pixels each include a photodiode formed in the substrate; and
a metal layer that blocks incoming light from reaching the photodiodes of the plurality of shielded crosstalk calibration pixels, wherein the metal layer includes openings over the photodiode of each of the exposed crosstalk calibration pixels.

5. The image sensor defined in claim 4 wherein each of the exposed crosstalk calibration pixels has a lateral size and wherein the opening has a width that is equal to the lateral size.

6. The image sensor defined in claim 4 wherein each of the exposed crosstalk calibration pixels has a lateral size and wherein the opening has a width that is smaller than the lateral size.

7. The image sensor defined in claim 4 wherein the metal layer includes an additional opening over the photodiode of at least one additional exposed crosstalk calibration pixel, wherein each of the exposed crosstalk calibration pixels and the at least one additional exposed crosstalk calibration pixel have a common lateral size, wherein the opening has a width that is equal to the lateral size, and wherein the additional opening has a width that is smaller than the lateral size.

8. The image sensor defined in claim 1, further comprising:
an additional calibration region having additional crosstalk calibration pixels, wherein the additional crosstalk calibration pixels include at least one additional exposed crosstalk calibration pixel and at least one additional shielded crosstalk calibration pixel.

9. The image sensor defined in claim 8 wherein the calibration region is located at a first location in the array of image sensor pixels and wherein the additional calibration region is located at a second location in the array of image sensor pixels that is separate from the first location.

10. An imaging system, comprising:
an image sensor having crosstalk calibration pixels that include two exposed crosstalk calibration pixels that share an edge, wherein all other edges of the two exposed crosstalk calibration pixels are shared with associated shielded crosstalk calibration pixels; and
processing circuitry configured to process signals from the two exposed crosstalk calibration pixels and the associated shielded crosstalk calibration pixels to deduce a spectral content of incoming light.

11. The imaging system defined in claim 10 wherein the processing circuitry is configured to process the signals from the two exposed crosstalk calibration pixels and the associated shielded crosstalk calibration pixels to determine an amount of crosstalk between the two exposed crosstalk calibration pixels and the associated shielded crosstalk calibration pixels.

12. The imaging system defined in claim 10 wherein the processing circuitry is configured to adjust system operations based on the processed signals and wherein the system operations include image edge sharpening operations and color correction operations.

13. The imaging system defined in claim 10 wherein the processing circuitry is configured to process the signals from the two exposed crosstalk calibration pixels and the associated shielded crosstalk calibration pixels to determine a modulation transfer function.

14. A system, comprising:
a central processing unit;
memory;
a lens;
input-output circuitry; and
an imaging device, wherein the imaging device comprises:
an array of image sensor pixels, wherein the array of image sensor pixels includes a calibration region having crosstalk calibration pixels, wherein the crosstalk calibration pixels comprise:
shielded crosstalk calibration pixels; and
a pair of directly adjacent unshielded crosstalk calibration pixels, wherein all exterior sides of the pair are shared with the shielded crosstalk calibration pixels;
processing circuitry configured to process signals from the pair of directly adjacent unshielded crosstalk calibration pixels and the shielded crosstalk calibration pixels to determine an amount of crosstalk between the pair of directly adjacent unshielded crosstalk calibration pixels and the shielded crosstalk calibration pixels.

15. The system defined in claim 14 wherein the shielded crosstalk calibration pixels are covered by a metal layer in a dielectric stack.

16. The imaging system defined in claim 10, wherein the processing circuitry is further configured to apply color correction matrices to image data based on the deduced spectral content of incoming light.

* * * * *